United States Patent [19]

Rhodes

[11] Patent Number: 5,152,097
[45] Date of Patent: Oct. 6, 1992

[54] TRAP FOR FIRE ANTS AND OTHER SMALL INSECTS

[76] Inventor: Don H. Rhodes, Rte. 2, Box 2315, Mineola, Tex. 75773

[21] Appl. No.: 749,955

[22] Filed: Aug. 26, 1991

[51] Int. Cl.$^5$ .............................................. A01M 1/20
[52] U.S. Cl. ..................................... 43/132.1; 43/131
[58] Field of Search ............................... 43/131, 132.1

[56] References Cited

U.S. PATENT DOCUMENTS

| | | | |
|---|---|---|---|
| 1,573,278 | 2/1926 | Schlesinger | 43/131 |
| 1,960,464 | 5/1934 | Thalheimer | 43/131 |
| 2,837,861 | 6/1958 | Graham, Sr. | 43/131 |
| 4,485,582 | 12/1984 | Morris | 43/132.1 X |
| 4,793,093 | 12/1988 | Gentile | 43/132.1 X |

Primary Examiner—Richard K. Seidel
Assistant Examiner—Patty E. Hong

[57] ABSTRACT

A poison dispenser for fire ants and other small insects comprising a base adapted to be staked to the ground in an infested area, and a roof supported on the base. The roof extends down over the base almost to the ground to define a narrow space around the perimeter of the trap to enable ants and other insects to enter the enclosure. The roof is supported by an upstanding tubular member mounted on the base, and having openings at its lower end. A quantity of poison bait is placed within the tubular member. The poison dispenser of the invention protects the bait from the weather, and it also eliminates the need to cover wide exposed areas with the bait, or to locate the ant hills, or to dispense poison on the individual ant hills. In addition, the poison dispenser isolates the bait from children, cats, dogs, birds and the like.

4 Claims, 2 Drawing Sheets

TRAP FOR FIRE ANTS AND OTHER SMALL INSECTS

BACKGROUND OF THE INVENTION

As described in a bulletin published by the Texas Agricultural Extension Service (B1536), entitled Fire Ants and Their Control, fire ants are of tremendous concern in many parts of the country, and especially in Texas in which relatively mild winters and other environmental conditions contribute to the rapid proliferation of fire ants in that state.

Currently, there is no single universal solution to the fire ant problem, although a number of home remedies have been attempted. For example, gasoline or other petroleum products have been used to kill fire ant colonies. However, this practice is not generally recommended because such products are dangerously flammable, kill grass and plants and seriously pollute the soil. Other remedies include the use of soap solutions, cleaning products or wood ashes, soaked into the fire ant mound, as well as battery acids, bleaches or ammonia products. However, all of these products are generally ineffective and dangerous, and they represent potentially serious pollutants.

Bait formulations are also available for killing fire ants. Such products usually contain pesticides formulated on bait of processed corn grits coated with soybean oil. However, soybean oil becomes rancid and less attractive to ants if it is exposed to sun light. Also, moisture and rain will dissolve the bait particles. There are several types of active ingredients presently on the market formulated as baits of for fire ants. For example, Amidinohydrazone or Hydrametaylnon (marketed under the Registered Trademark AMDRO) kills ants ingesting the product. However, the product can be dangerous if ingested by children or small animals. Also the product can pollute the soil and water.

It is an objective of the present invention to provide a protected dispensing trap in which appropriate poisonous bait such as AMDRO may be stored, and which provides a protective housing for the bait to shield the bait from sunlight, rain or other weather conditions.

Another objective of the invention is to provide such a trap, or poison dispenser, with eliminates the need to cover large areas with the bait, or to locate the ant hills, or to dispense poison on individual ant hills and which serves to keep the bait away from children and small animals.

SUMMARY OF THE INVENTION

A poison dispenser for fire ants and other small insects is provided which comprises a base adapted to be placed on the ground in a fire ant infested area, and which also comprises a roof supported on the base. The roof extends down over the base almost to the ground to define a narrow space around the perimeter of the assembly for ants to enter the enclosure. A quantity of poison bait may be placed within the enclosure to be ingested by the ants.

DETAILED DESCRIPTION OF THE ILLUSTRATED EMBODIMENT

Figure 1:
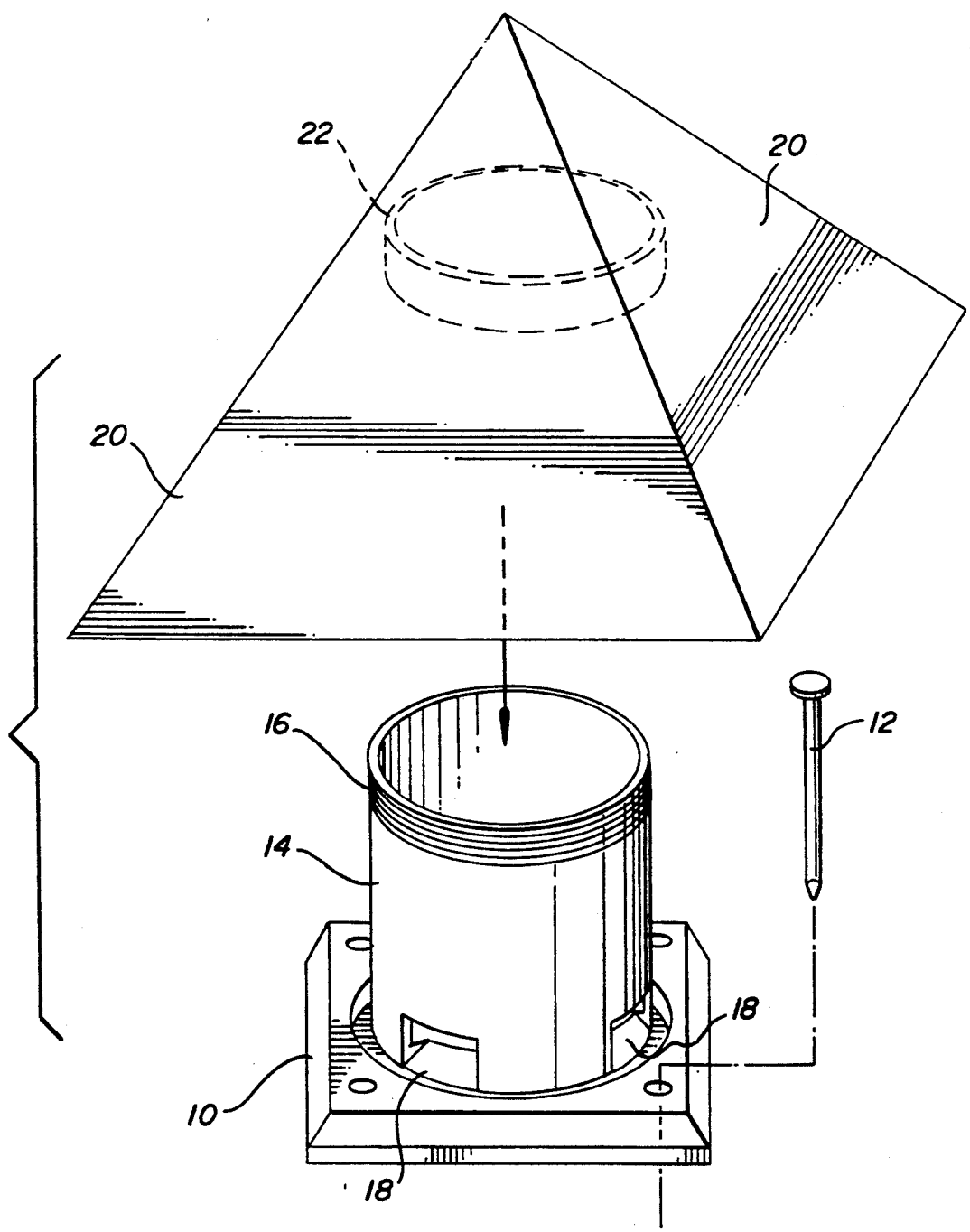
FIG. 1 is an exploded perspective view of a poison dispenser incorporating the concepts of the present invention in one of its embodiments.
Figure 2:
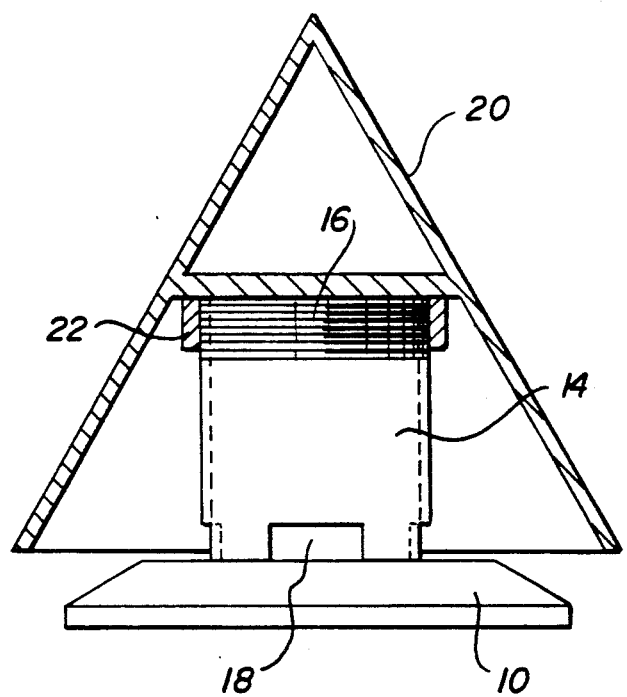
FIG. 2 is an elevational view of the poison dispenser of FIG. 1, partly in section.
Figure 3:
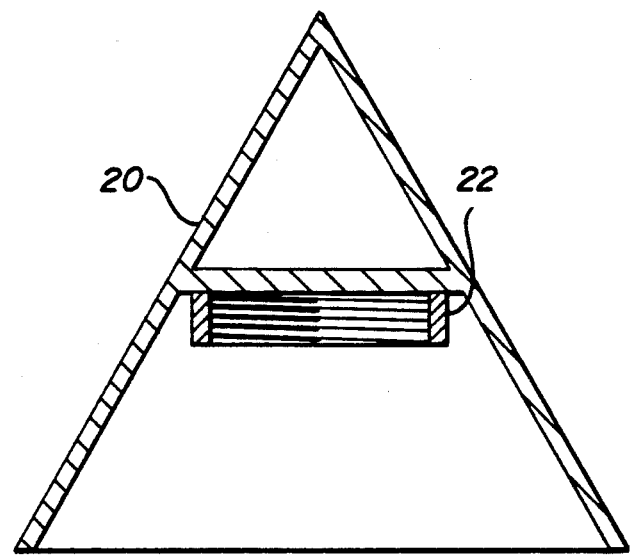
FIG. 3 is a sectional view of a cover component of the poison dispenser of FIGS. 1 and 2.

The poison dispenser illustrated in FIGS. 1, 2 and 3 comprises a base 10 which has a square configuration. The base has holes at its respective corners, each of which is adapted to receive a stake 12, so that the base may be staked to the ground in a fire ant infested area. Alternatively the base may simply rest on the ground, or be secured to the ground by other appropriate fasteners.

The base also includes an upstanding tubular component with a hollow cylindrical configuration 14 which is coaxially mounted on base 10, and which extends from the base 10. The tubular component 14 has an external thread 16 formed at its upper end. The cylindrical component also has a series of openings 18 located at its lower end and spaced around its periphery.

A roof 20 is supported on the tubular component 14 by virtue of a cap 22 supported in the interior of the roof 20. Cap 22 has internal threads which engage the external threads 16 at the upper end of the tubular component 14. In the illustrated embodiment, the roof 20 has a pyramid-like configuration. However, the roof may have other configurations.

The roof 20 is supported over the base 10 in a manner such that the lower edge of the roof is displaced upwardly from the ground so as to provide an opening extending around the periphery of component 10 to permit the fire ants to enter the trap. The ants are then able to enter through the openings 18 into the interior of the tubular component 14, and to ingest the bait contained in the tubular component 14.

The poison dispenser shown in FIGS. 1, 2 and 3 may be formed of metal, plastic, or any other appropriate material. The trap is simple and inexpensive in its construction, and yet is rugged and capable of long usage.

It will be appreciated that when the poison dispenser is assembled, as shown in FIG. 2, the bait contained in the tubular component 14 is shielded against sunlight, rain, and other weather conditions. Also, the construction is such that only the fire ants, or other small insects, can enter the poison dispenser through the small peripheral opening at the bottom of the roof 20, and the bait is kept out of the reach of children and small animals.

It will be appreciated that while a particular embodiment of the invention has been shown and described, modifications may be made. Also, the invention may find application to other insects. It is intended in the claims to cover all modifications which come within the true spirit and scope of the invention.

I claim:

1. A poison dispenser for fire ants and other insects comprising: a base adapted to be placed on the ground in an infested area, an upstanding tubular component removably mounted on said base, a roof component mounted on the top of said tubular component and extending downwardly toward said base to form an enclosure with said base and to define a narrow opening with respect to said base extending around the perimeter of said base, said opening being large enough to permit fire ants and other insects to enter the interior of the structure and small enough to exclude larger creatures, said upstanding tubular component being adapted to receive bait and to support the roof, and said tubular component having openings at the bottom end thereof to provide entrances for the insects into the interior of said tubular component.

2. The point dispenser defined in claim 1, in which said base has a flat configuration and has holes therein to permit the base to be staked to the ground, and in which said upstanding tubular component is adapted to receive bait and to support the roof, said tubular component having openings at the bottom end thereof to provide entrances for insects into the interior of said tubular component.

3. The point dispenser defined in claim 1, in which said upstanding tubular component has a cylindrical configuration with a threaded upper end, and said roof includes an intermediate threaded cap mounted on the under side thereof to be threaded to the threaded upper end of said upstanding tubular components.

4. The poison dispenser defined in claim 1, in which said roof has a pyramid-like configuration.

* * * * *